March 26, 1935.  C. G. DOWNING  1,995,605

MAGNETIC TRANSMISSION

Filed Aug. 7, 1933

WITNESS:
H. N. Hagene

INVENTOR
Charles G. Downing

Patented Mar. 26, 1935

1,995,605

UNITED STATES PATENT OFFICE 1,995,605

MAGNETIC TRANSMISSION

Charles G. Downing, Maysville, Ky., assignor of ten per cent to Patsy Goff Downing, ten per cent to Margaret M. Downing, ten per cent to Mary H. Downing and ten per cent to Martha P. Downing Application August 7, 1933, Serial No. 683,971

10 Claims. (Cl. 172—239)

The invention is a machine that is intended to be used on automobiles, motor cars, or other machines that require wide variation in the torque from the driving power and the object of the invention is to connect and transform the driving power to the driven load, that is, to allow the torque of the driving power to operate the driven load requiring a much higher torque and to automatically adapt the driving power to the various operating demands of the load.

Figure 1:
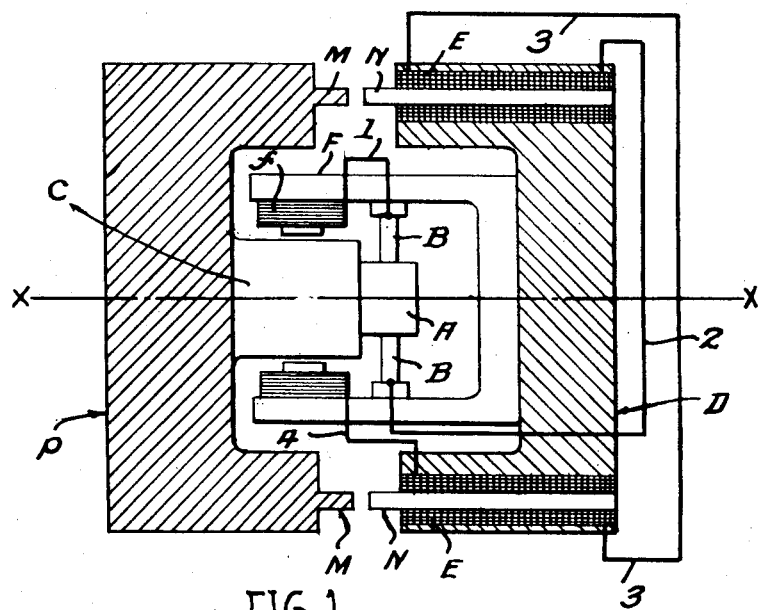
Figures 2, 3:
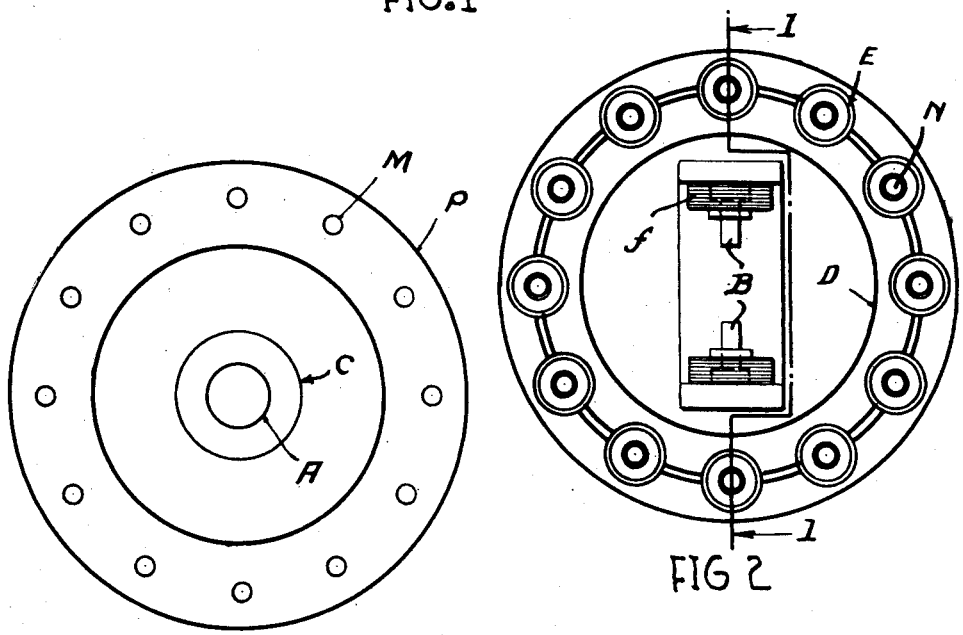

One form of invention is illustrated in the accompanying drawing. Fig. 1 shows a longitudinal section along the axis 1—1 of Fig. 2 with a diagram of the wiring connections. Fig. 2 is a diagram of the face of the driven element, showing the arrangement of the magnets N with the field magnets F and brushes B of the controlling generator. Fig. 3 shows the driving element P showing the arrangement of magnets M with the armature C and the commutator A shown.

The machine consists of a driving unit P and a driven unit D that revolve about the axis X . . . X. Each unit has magnet ends M and N, at intervals arranged so that in revolving they pass over the magnet ends of the opposing unit with very small clearance. The magnets of D are energized by electromagnets E. The projections on P are magnetized by induction from the magnets of D.

The driving unit P is fastened directly to the source of power except in cases where operating conditions will not permit the encountered vibration. In such cases it is connected to the driving power by means of a slipping clutch.

The magnet ends are so placed that as P revolves over the face of D, there is a period in which P is exerting no practical force on D. In this period, or the acceleration period, P is being accelerated by the driving power, then as the magnet ends of P swing over those of D there is a short interval of power period in which P loses a great deal of its momentum as it exerts a great force on D. Thus P is constantly gaining momentum in the power period; to lose that momentum in an impulse much greater than the torque of the driving power, which is exerted on P. While on D there is a constant pound of impulses heavy enough to produce motion.

While there are many methods by which the transmission described above can adapt the power to the different loads, I am using an internal generator control. The armature is built into the driving unit P with the axis of the armature X . . . X concentric with the axis of P. The field magnets of the generator are built into D and likewise concentric and parallel to D. The commutator brushes B are likewise built into D and supply the current for the transmission magnets N.

As shown by the wiring diagram in Fig. 1, the coils f of the generator field magnet F, the coils of the armature C, and the coils E of the clutch magnets are in series by means of the connections 1, 2, 3 and 4 and the commutator brushes B. The field strength of the clutch magnets E thus is dependent upon the relative speeds of rotation of the field coils f and the armature coils. As the gap between the field poles and the armature coils is kept at a very small minimum, as usual in generator design, and the distance from the field poles to the magnetic circuit completing member P is very much greater, most of the magnetic flux will be through the armature coils and the iron armature core, between the field poles. The gap between field and armature is so relatively small that most of the flux will be through the armature coils and its ferrous core; only a very small part being diverted through member P. Yet poles M and N are so close to a single plane that as they pass each other a very strong magnetic circuit is created through poles N, M, member P, poles M, N, opposite, and member D. It will be understood that support is the only function of the member D as a whole, and its material may be non-magnetic, with ferrous material arranged to complete the magnetic circuit as just mentioned, without shorting this circuit from one coil E to the other.

I have shown the dynamo-electric machine F, C between the members P and D; but it will be understood that the principle of my invention merely involves an operation of this machine in some proportion to the relative rate of rotation of the members P and D, which in turn is dependent upon the effectiveness of magnetic clutching, dependent upon the output of the dynamo-electric machine. The elements of this generator therefore may be connected to the respective members P and D elsewhere than between them, and need not, necessarily, be directly connected to them.

In operation the more revolutions that P gains over D, the greater will be the electrical output from the control generator and the greater will be the attraction of the transmission magnets of P upon D. But as the ratio of the speed of P to D drops—due either to a drop in power, or to a rapid acceleration of the load that D is driving— the output of the generator will decrease and will decrease the attraction of the transmission magnets of P upon the magnets of D.

It will be understood that either the member P or the member D may be connected to the driving means, such as the engine of a motor vehicle, while the other member is connected to the driven means, such as the drive shaft of the vehicle; in either case the axis of rotation being the axis X . . . X of Fig. 1, for shafts connected to the respective members. Modifications may occur, and I am not limited to the precise disclosure herein, but what I claim as new and desire to secure by Letters Patent is:

1. In combination, two members, one to be driven by the other, carrying respectively the field and the armature elements of a dynamo-electric machine so that the output of said machine is varied according to the rate of relative movement of the members, and means on the respective members additional to said dynamo-electric machine, including magnetic-circuit-completing material and coils for setting up a magnetic field therefor energized by the current from the dynamo-electric machine, variably according to the variation of the machine output.

2. A combination as set forth in claim 1, in which the magnetic circuit completing material is distributed in the form of pole pieces on the respective members, spaced in the direction of relative movement of the members, so that the effectiveness of the magnetic circuit completed by the material varies alternately between a maximum and a minimum, for any degree of field strength, as the pole pieces relatively move into and out of alinement incident to the relative movement of the members.

3. In a machine of the character described, a driving element and a driven element, means carried on the respective elements for completing a magnetic circuit, including magnetic material and coils for setting up a magnetic field therefor, and a dynamo-electric generator with its field elements moved by one member and its armature elements moved by the other member, said generator being in circuit with the coils whereby the coils are energized in accordance with the rate of relative movement of the members, for the purposes set forth.

4. A machine as set forth in claim 3, in which the means for completing the magnetic circuit comprises pole pieces on the respective members, spaced in the direction of relative movement of the members, for the purposes set forth.

5. A machine as set forth in claim 3, in which the members have portions spaced apart farther than their magnetically coacting portions, with the generator elements between said portions.

6. A machine as set forth in claim 3, in which the members have portions spaced apart farther than their magnetically coacting portions, with the generator elements between said portions, and in which the magnetically coacting portions of the members are in the form of pole pieces spaced in the direction of relative movement of the members.

7. In a machine of the character described, a driving member and a driven member relatively rotatable on a common axis, with radially outwardly located portions of magnetically active material on the respective members, on circles concentric with the relative rotation of the members, said portions being materially spaced around said circles and arranged to make and break alinement incident to the relative rotation, means to set up a magnetic field for said portions, and dynamo-electric means operated with effectiveness for current generation in accordance with the relative rotation and supplying current to energize the means for setting up said magnetic field.

8. In a machine of the character described, a driving member and a driven member comprising respective devices for effecting magnetic clutching action between the members, said members being relatively rotatable to a degree inverse to the effectiveness of clutching action, and dynamo-electric means in addition to said magnetically clutching device, operated with variable effectiveness of output according to the rate of relative rotation of the members, and supplying current to set up the magnetic field of the magnetically clutching devices, varying with the effectiveness of output of the dynamo-electric means.

9. A machine as set forth in claim 8, in which the magnetically acting devices for clutching are spaced around circles of relative rotation of the members so that the magnetic action alternately increases and decreases in effectiveness as the devices approach and recede from each other due to the relative rotation of the members.

10. In a machine of the character described connecting a driving power and a driven load containing a driving member connected to the driving power and a driven member connected to the driven load, relatively rotatable on a common axis with radially outwardly located portions of magnetically active material on the respective members, on circles concentric with the relative rotation of the members, said portions being materially spaced around said circles and arranged to make and break alignment incident to the relative rotation, means to set up a magnetic field for said portions and electric means operated with effectiveness for current supply in accordance with the relative rotation of the driving power and the driven load and supplying current to energize the means for setting up said magnetic field.

CHARLES G. DOWNING.